United States Patent [19]

Watanabe

[11] Patent Number: 4,479,532
[45] Date of Patent: Oct. 30, 1984

[54] A SYSTEM FOR CONTROLLING A HYDRAULIC COOLING FAN FOR AN ENGINE AS A FUNCTION OF AMBIENT AND COOLANT TEMPERATURES

[75] Inventor: Masahiro Watanabe, Yokohama, Japan

[73] Assignee: Kabushiki Kaisha Komatsu Seisakusho, Tokyo, Japan

[21] Appl. No.: 332,733

[22] Filed: Dec. 21, 1981

[30] Foreign Application Priority Data

Dec. 25, 1980 [JP] Japan .................. 55/185504[U]

[51] Int. Cl.$^3$ .............................................. F28F 27/00
[52] U.S. Cl. .................. 165/39; 123/41.12; 123/41.49; 165/40
[58] Field of Search .............. 165/39, 40; 123/41.12, 123/41.11, 41.49; 236/35; 62/184

[56] References Cited

U.S. PATENT DOCUMENTS

| | | | |
|---|---|---|---|
| 3,893,555 | 7/1975 | Elmer | 123/41.12 |
| 4,062,329 | 12/1977 | Rio | 123/41.12 |
| 4,200,146 | 4/1980 | Olson | 165/39 |
| 4,203,712 | 5/1980 | Uehara | 417/218 |
| 4,302,156 | 11/1981 | LaFlame | 123/41.12 |
| 4,313,402 | 2/1982 | Lehnhoff et al. | 123/41.12 |
| 4,348,990 | 9/1982 | Nolte et al. | 123/41.12 |

FOREIGN PATENT DOCUMENTS

| | | | |
|---|---|---|---|
| 2421351 | 11/1979 | France | 165/39 |
| 427157 | 2/1975 | U.S.S.R. | 123/41.12 |

Primary Examiner—Sheldon J. Richter
Attorney, Agent, or Firm—Armstrong, Nikaido, Marmelstein & Kubovcik

[57] ABSTRACT

An automatic actuator system for a cooling fan of an internal combustion engine comprising a first detector for detecting the temperature of the cooling water in a cooling system for the engine and a second detector for detecting the atmospheric temperature. An electrical control circuit generates a first control signal corresponding to the cooling water temperature detected by the first detector and a second control signal corresponding to the maximum number of revolutions of the cooling fan as a function of atmospheric temperature detected by the second detector and generates an electrical output signal corresponding to the difference between the first and second control signals. A proportional control valve is coupled to the control circuit and controlled by the output signal of the control curcuit, and a cooling fan driving device is coupled to the control valve, wherein the rotational speed of the fan driving device is controlled as a function of the flow rate of fluid controlled by the proportional control valve.

6 Claims, 2 Drawing Figures

A SYSTEM FOR CONTROLLING A HYDRAULIC COOLING FAN FOR AN ENGINE AS A FUNCTION OF AMBIENT AND COOLANT TEMPERATURES

BACKGROUND OF THE INVENTION

This invention relates generally to an automatic actuator system for a cooling fan of an internal combustion engine mounted on large-sized vehicles.

Generally, in water-cooled internal combustion engines mounted on vehicles, heat removal from the cooling water which has cooled the engine has been made by means of a radiator and a cooling fan directly driven by the engine. Therefore, the conventional engine cooling system has been disadvantageous in that the cooling fan is driven even when the engine is being warmed up immediately after it is started; that is; when cooling of the engine is unnecessary or even when the engine is run under cold condition and/or in cold regions thus consuming the output of the engine wastefully. In order to eliminate such a disadvantage, there has been proposed such an arrangement that the cooling water temperature is detected and, when the temperature thus detected exceeds a preset temperature, a cooling fan is driven by means of a hydraulic motor or an electric motor. However, because the control of the engine's cooling in such arrangement is carried out by on-off action, it has been impossible to obtain a satisfactory effect on reducing wastefulness of the engine output in case of large-sized vehicles.

SUMMARY OF THE INVENTION

The present invention has been devised with a view to eliminating the above-mentioned disadvantage and aims to provide an automatic actuator system for a cooling fan of an internal combustion engine arranged to control the rotational speed of the cooling fan based on the information pertaining to the atmospheric temperature and the cooling water temperature thereby minimizing the power loss caused by the cooling fan.

In accordance with a first aspect of the present invention, there is provided an automatic actuator system for a cooling fan of an internal combustion engine characterized by a control circuit arranged to generate a control signal corresponding to the cooling water temperature detected in a cooling line of the engine, a proportional control valve unit adapted to be controlled by the output of said control circuit, and a cooling fan driving means, the rotational speed of which is controlled by the flow rate of the fluid under pressure controlled by said proportional control valve means.

In accordance with a second aspect of the present invention, there is provided an automatic actuator system for a cooling fan of an internal combustion engine, comprising a control circuit arranged to compute a maximum rotational speed corresponding to the atmospheric temperature and alter the computed value by a signal generated in response to the cooling water temperature detected from the engine's cooling system so as to generate thereby an output control signal, a proportional control valve unit adapted to be controlled by the output signal of said control circuit and a cooling fan driving means, the rotational speed of which is controlled by the flow rate of the fluid under pressure controlled by said proportional control valve means.

The above and other objects, features and advantages of the present invention and the manner of attaining them will become more apparent, and the invention itself will best be understood, from the following description of the preferred embodiment taken in conjunction with the accompanying drawings.

DETAILED DESCRIPTION OF THE INVENTION

Figure 1:
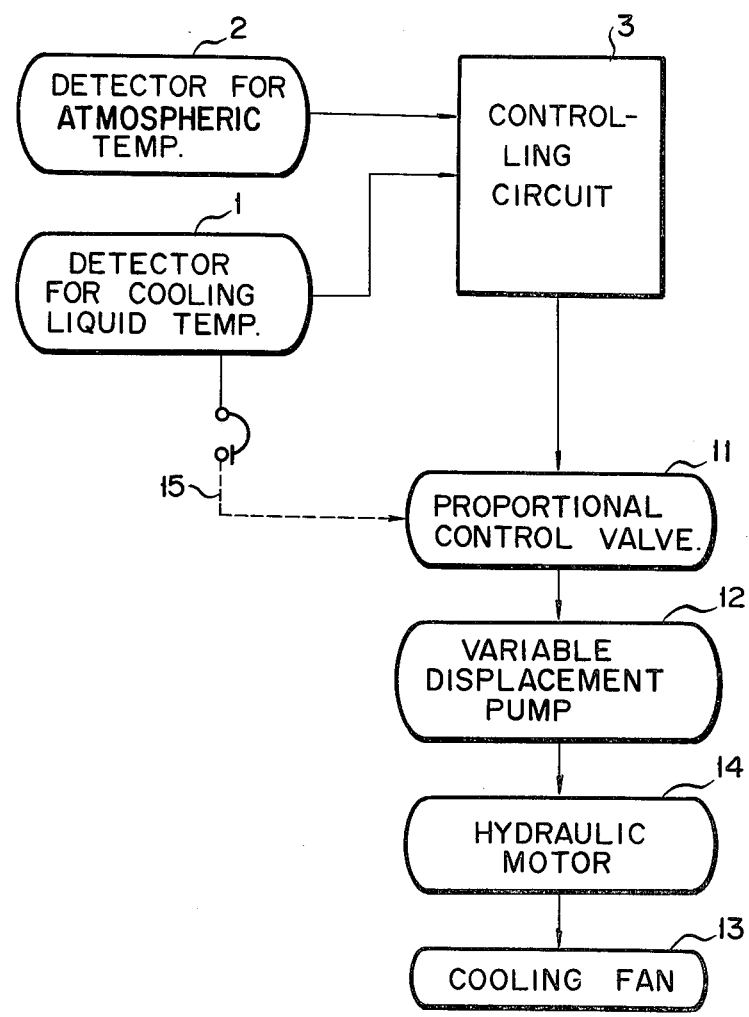
FIG. 1 is a block diagram showing schematically the whole of an automatic actuator system for a cooling fan of an internal combustion engine according to the present invention.
Figure 2:
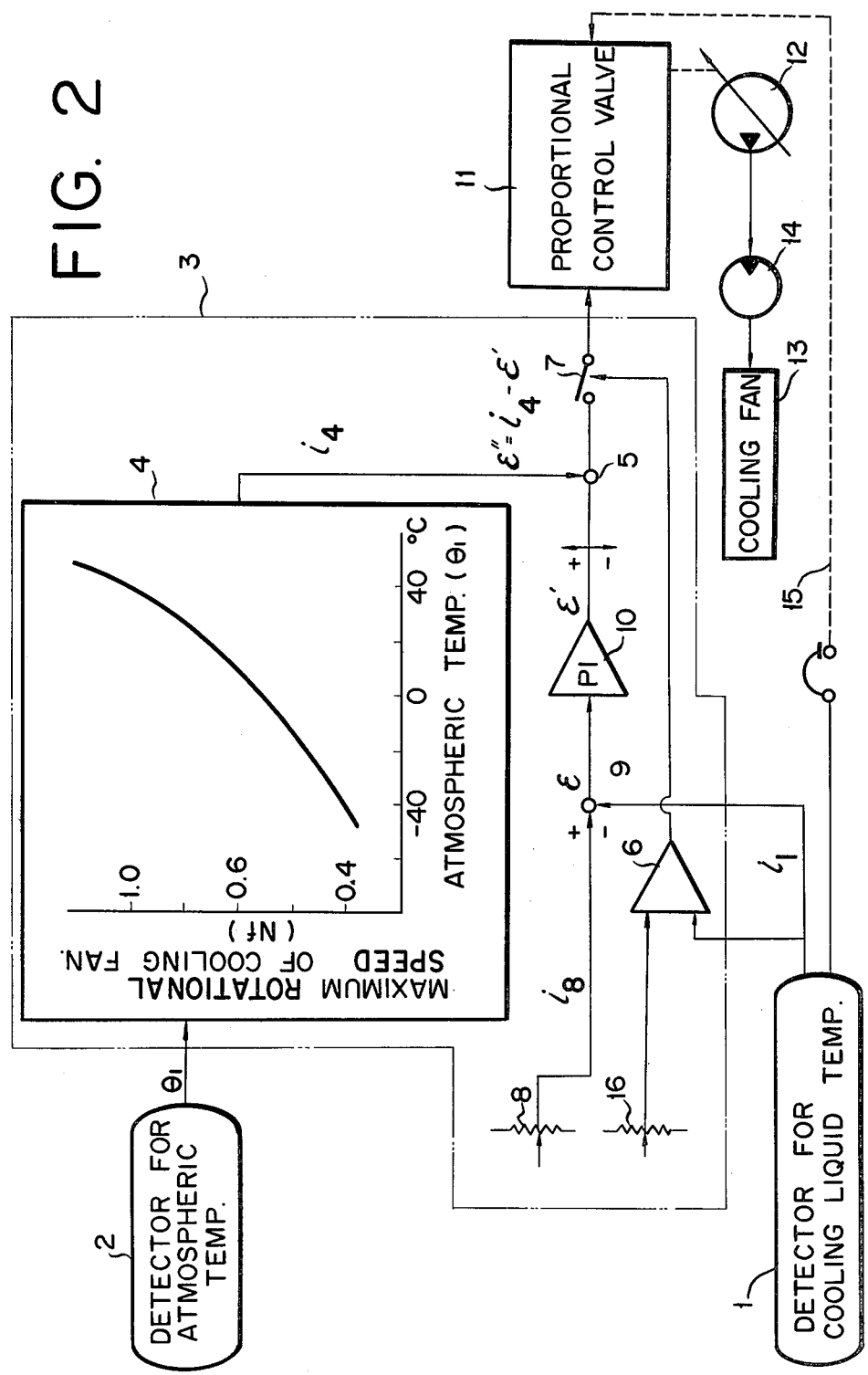
FIG. 2 is a detailed block diagram of a control circuit of the cooling fan actuator system of the present invention.

The present invention will now be described in detail below by way of example only with reference to the accompanying drawings. FIG. 1 is a block diagram of an automatic actuator system of the present invention for a cooling fan of an internal combustion engine and its arrangement is made such that a part of the cooling system (not shown) for the engine, for example, a cooling water temperature detector 1 mounted in an inlet of a radiator and an atmospheric temperature detector 2 may generate and transmit analog signals to a control circuit 3. The control circuit 3 comprises as shown in FIG. 2 an operational circuit 4 arranged to compute the rotational speed or number of revolutions per unit of time Nf of a cooling fan 13 relative to an atmospheric temperature $\theta_1$. The operational circuit 4 is arranged to apply an input signal corresponding to the rotational speed of the cooling fan 13 relative to the atmospheric temperature detected at that time to a difference circuit 5. Further, the cooling water temperature is applied as an input signal to an operational amplifier 6 together with a signal generated by a setting unit 16 for presetting a temperature at which the cooling fan 13 starts to rotate.

When the temperature of the cooling water exceeds the preset temperature, the output of the operational amplifier 6 turns on a switch 7 which is provided on the output side of the added circuit 5, and at the same time, the signal $i_1$ generated by the above-mentioned cooling water temperature detector 1 is applied as an input to the added circuit 9 together with a signal $i_8$ generated by a setting unit 8 for presetting a control command value or temperature of cooling water, thereby computing deviation $\epsilon = i_1 - i_8$ of the cooling water temperature from the control command value thereof.

This deviation $\epsilon$ is amplified by the PI amplifier 10 and converted into a control signal $\epsilon$ which is applied as an input to a added circuit 5. As described above, the rotational speed of the cooling fan 13 corresponding and relative to the atmospheric temperature is applied by the operational circuit 4 as an input signal $i_4$ to the added circuit 5. The input signal $i_4$ is combined with the signal $\epsilon'$ generated in response to the cooling water temperature and amplified by the PI amplifier 10, and the combined signal $\epsilon'' = i_4 - \epsilon'$ is then applied as a control signal through the switch 7 to a proportional control valve unit 11.

The proportional control valve unit 11 is, for example, a solenoid-actuated proportional reduction valve or a servo-valve which is adapted to control the flow rate of the fluid under pressure in response to the control signal $\epsilon''$. The fluid under pressure, which is controlled by the porportional control valve unit 11, is supplied to a variable displacement pump 12 to control the tilt angle of the swash plate of the pump 12. Connected to the discharge side of the variable displacement pump 12 is a hydraulic motor 14 arranged to drive the cooling fan 13 so that the fan 13 may be driven at a rotational speed corresponding to the flow rate of the fluid under pressure discharged by the variable displacement pump 12.

Nevertheless, it is not necessary for the system of the present invention to detect the atmospheric temperature and add the signal corresponding to the rotational speed relative to the atmospheric temperature to the added circuit 5. The foregoing object of the present invention can be achieved only by controlling the actuation of the cooling fan based on the detection of the cooling water temperature.

Further, reference numeral 15 denotes an emergency circuit which is arranged to be rendered operative when it is required to continuously rotate the cooling fan 13 as in the case of the engine being overheated and which is arranged to apply as an input signal the output at the maximum rotational speed of the fan to the proportional control valve unit thereby rotating the cooling fan 13 continuously irrespective of the signal transmitted by the control circuit.

Since the present invention is constructed as mentioned in detail hereinabove, when the engine is running for warming-up or when the engine is in overcooled condition as in the case of its being used in cold seasons and/or in cold regions, the switch 7 is turned off so that the cooling fan 13 cannot be driven thereby consuming no output of the engine and eliminating the risk of occurrence of reduction in engine's performance because of its being overcooled and difficulties in starting.

Further, since the system of the present invention is arranged to detect the cooling water temperature and generate a control signal corresponding to the cooling water temperature thus detected which controls the number of revolutions of the cooling fan 13, the cooling air volume can be controlled in proportion to the load of the engine. As a result, the engine can always be run at an optimum temperature so that the capacity of the engine can be fully utilized.

Further, because the arrangement is made such that the atmospheric temperature is detected and a signal representative of the maximum rotational speed of the cooling fan corresponding to the detected atmospheric temperature is applied as an input to the added circuit together with the control signal generated by the cooling water temperature, the actuation of the cooling fan can be controlled by the control based on the atmospheric temperature detected at that time and the control based on the cooling water temperature. Accordingly, more fine control of the actuation of the engine cooling fan can be achieved, and even when the atmospheric temperature is relatively high, the engine can be driven without causing any overheating thereof.

It is to be understood that the foregoing description is merely illustrative of a preferred embodiment of the invention, and that the scope of the invention is not to be limited thereto, but is to be determined by the scope of the appended claims.

What is claimed is:

1. An automatic actuator system for a cooling fan of an internal combustion engine, said system comprising first detector means for detecting the temperature of the cooling water in a cooling system for the engine, second detector means for detecting the atmospheric temperature, an electrical control circuit means for generating a first control signal corresponding to the cooling water temperature detected by said first detector means and a second control signal corresponding to the maximum number of revolutions per unit of time of the cooling fan as a function of atmospheric temperature detected by said second detector means, and for generating an electrical output signal corresponding to the difference between the first and second control signals, a proportional control valve means coupled to said control circuit means and controlled by the output signal of said control circuit means, and a cooling fan driving means coupled to said control valve means, wherein the rotational speed of the fan driving means is controlled as a function of the flow rate of fluid controlled by said proportional control valve means.

2. The automatic actuator system for a cooling fan as claimed in claim 1, wherein said first detector means for detecting the cooling water temperature is positioned in a cooling water inlet port of a radiator in the engine cooling system.

3. The automatic actuator system for a cooling fan as claimed in claim 1, wherein said proportional control valve means is a solenoid-actuated porportional valve.

4. The automatic actuator system for a cooling fan as claimed in claim 1, wherein said cooling fan driving means is a hydraulic motor connected through a variable displacement pump to said porportional control valve means.

5. The automatic actuator system for a cooling fan as claimed in claim 1, wherein said control circuit comprises a first setting means for generating an electrical signal corresponding to a preset temperature at which the cooling fan starts rotation, an operational amplifier means for comparing the signal derived from said first setting means with the first control signal derived from said cooling water temperature detector means, said operational amplifier means generating an output signal when the cooling water temperature exceeds said preset temperature, a switch means, coupled to the output of said operational amplifier means and adapted to be turned on by the output signal of said operational amplifier, and a second setting means for presetting a control command temperature of cooling water.

6. The automatic actuator system for a cooling fan as claimed in claim 1, further comprising an emergency circuit means coupled to said proportional control valve means, said emergency circuit means being activated in response to predetermined conditions, wherein said emergency circuit means, when activated, provides an output signal corresponding to the maximum rotational speed of the cooling fan to said porportional control valve means irrespective of the signal derived from said control circuit means.

* * * * *